United States Patent [19]

Johnston

[11] 4,286,579

[45] Sep. 1, 1981

[54] CLOSED LOOP SOLAR COLLECTOR SYSTEM

[76] Inventor: Barry Johnston, 1622 Q St., NW., Washington, D.C. 20009

[21] Appl. No.: 43,799

[22] Filed: May 30, 1979

[51] Int. Cl.³ .............................................. F24J 3/02
[52] U.S. Cl. ................................................... 126/438
[58] Field of Search ............... 126/433, 434, 438, 435, 126/437

[56] References Cited

U.S. PATENT DOCUMENTS

| | | | |
|---|---|---|---|
| 3,178,113 | 4/1965 | Curry et al. | 237/8 |
| 3,390,672 | 7/1968 | Snelling . | |
| 4,061,131 | 12/1977 | Bohanon | 126/433 |
| 4,098,264 | 7/1978 | Brokaw | 126/438 |
| 4,108,154 | 8/1978 | Nelson | 248/397 |
| 4,110,986 | 9/1978 | Tacchi | 60/641 |
| 4,121,566 | 10/1978 | Radenkovic | 126/438 |
| 4,198,954 | 4/1980 | Meijer | 126/438 |

FOREIGN PATENT DOCUMENTS

| | | | |
|---|---|---|---|
| 2601673 | 7/1977 | Fed. Rep. of Germany . | |
| 2800439 | 7/1979 | Fed. Rep. of Germany | 126/438 |
| 1069317 | 7/1954 | France | 126/434 |

*Primary Examiner*—Stephen P. Garbe
*Attorney, Agent, or Firm*—Lowe, King, Price & Becker

[57] ABSTRACT

A closed loop solar collector system includes a linear concentrating parabolic reflector, a linear vaporizer tube horizontally aligned along the focal line of the parabolic reflector, and a fluid metering assembly attached to the input end of the vaporizer tube for precisely metering a quantity of a vaporizable heat transfer fluid from a supply tank to the vaporizer tube. Solar energy concentrated by the parabolic reflector on the vaporizer tube vaporizes the heat transfer fluid. The heated vapor flows out the outlet end of the tube opposite the fluid metering assembly through a pipe and enters a heat exchanger. The heat exchanger contains a heat absorptive medium which absorbs heat from the vaporized fluid to cause the fluid to condense and release its latent heat of vaporization to the heat absorptive medium. The condensed fluid flows back to the heat storage tank for re-use under pressure provided by the vaporized fluid entering the heat exchanger. The heat exchangers are modular and a plurality of them can be interconnected to provide a desired amount of heat storage capacity. The heat stored by the heat exchangers can be used, for example, to heat air or water for domestic space or hot water heating systems, to power the vaporization cycle of an air conditioning unit, or to power a thermoelectric generator.

15 Claims, 13 Drawing Figures

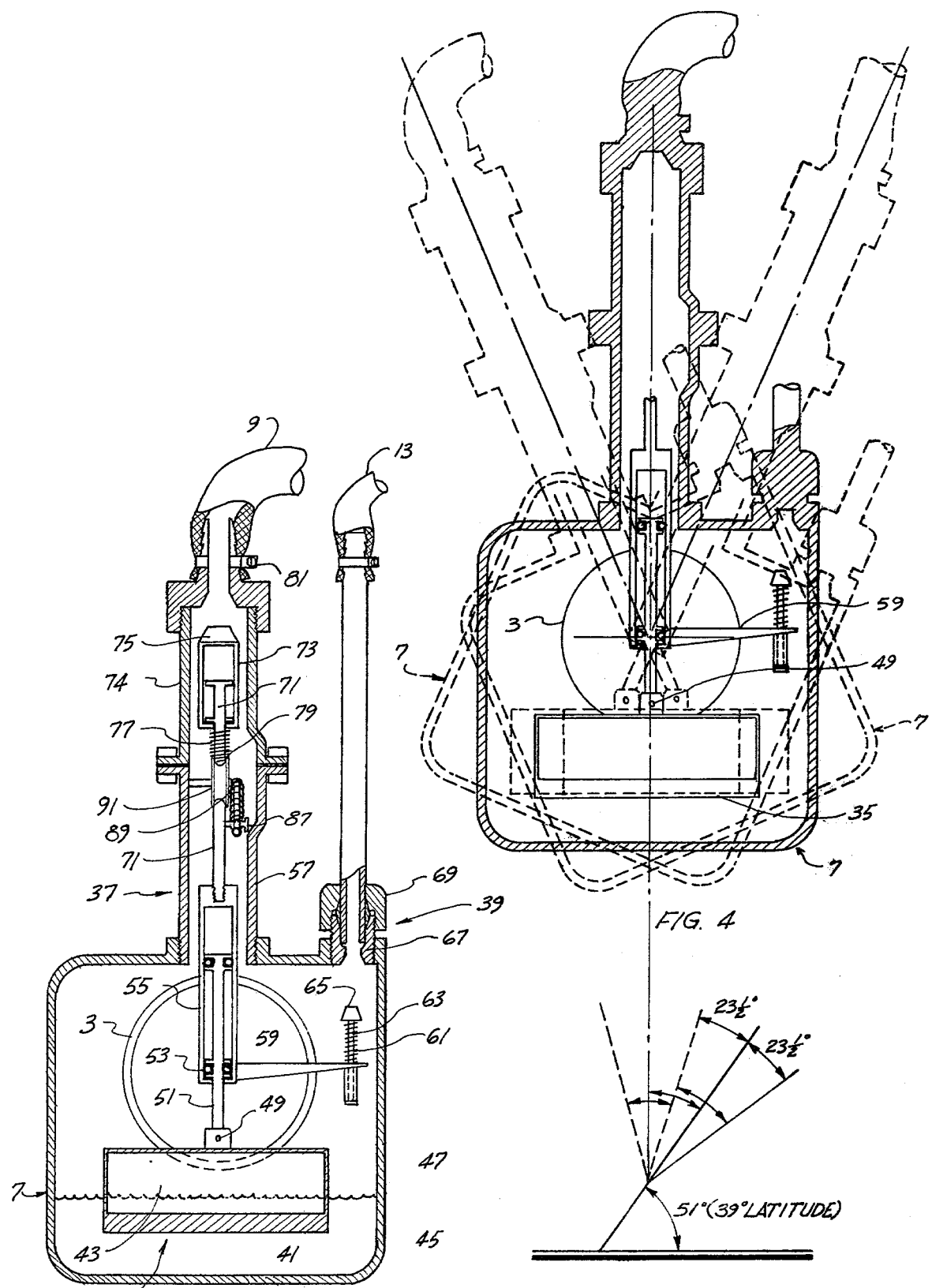

CLOSED LOOP SOLAR COLLECTOR SYSTEM

BACKGROUND OF THE INVENTION

The invention relates to the field of solar collector systems and more particularly to a closed loop solar collector system having a linear parabolic reflector and a linear receiver tube placed at the focal line of the reflector for vaporizing a quantity of heat transfer fluid contained in the receiving tube.

Solar heating holds much promise for supplying a portion of the energy needs of the nation in the near future. Unlike many forms of energy, solar energy is non-polluting, and depletes none of our valuable hydrocarbon natural resources. Solar energy is thus essentially free and can be utilized directly by individuals, unlike conventional electric power which must be generated in a central location to be cost effective.

While the source of solar energy, the sun, is free, there are several limitations on the state of the art of solar collectors which affects their cost effectiveness versus more conventional energy sources, such as coal, oil or nuclear. The effectiveness of a solar energy collector depends primarily on its siting, e.g., locations which have a high number of substantially cloudless days, such as the south-western United States, are good sites for solar collectors, whereas areas such as the Pacific northwest, which have few cloudless days are less desirable. Another factor is the type of collector used. Presently, both flat collectors and concentrating collectors are known. Recent studies have implied that concentrating collectors are equal to, or better than the flat plate collectors in terms of efficiency under both cloudless and partly overcast (diffuse) lighting conditions. While flat plate collectors are somewhat simpler to construct than those of the concentrating type, the higher temperatures (over 100° C.) achievable by concentrating collectors, result in higher theoretical efficiencies than the flat-plate type.

Concentrating collectors come in many types, as outlined in a Sandia Laboratory Report No. 78-0949 entitled "Linear Concentrating Solar Collectors-Current Technology and Applications" (1978). From a review of the art, it is apparent that in most cases the simpler the design of the concentrating collector and allied systems, the higher the efficiency of heat conversion is. In addition, a simple system usually is more reliable and more cost effective from a manufacturing standpoint. Systems which must use an outside source of electrical power to operate auxiliary pumps or tracking mechanisms preclude their use at remote or wilderness sites. Complicated tracking devices (for following the diurnal or annual motion of the sun) or exotic materials merely place solar energy one step further from utilization by the ordinary citizen.

In a typical linear concentrating collector system, a trough-like linear parabolic reflector is mounted either east-west or north-south, depending on the type of sun tracking system to be used. A receiver tube, constructed from glass or metal and overcoated with a heat absorptive coating, is disposed along the focal line of the linear parabolic reflector. A vaporizable heat transfer fluid, such as water, Freon, or Therminol-66 (a heat transfer oil) is contained within the receiver tube. Solar energy concentrated upon the receiver tube by the parabolic reflector heats the fluid and causes it to vaporize. The fluid absorbs a great deal of heat energy when vaporized. Depending upon the exact design of the collector and the type of transfer fluid used, peak efficiencies of approximately 60% with receiver tube output temperatures (of the vaporized heat transfer fluid) of from 100° C. (for water) to 315° C. (for Therminol-66) have been achieved by present day systems.

While the general form of such concentrating collector systems is well-known, many areas of collector system designs have yet to be fully explored. For example, a concentrating collector can be operated as an open loop or a closed loop system. In an open loop system, the heat transfer fluid, generally water, flows once through the receiver tube, is vaporized into steam, and then the steam is used to drive a compressor, turbine or other such device. The spent, low enthalpy steam is then allowed to escape into the atmosphere. While this system offers the benefit of a high theoretical operating efficiency because of the large difference between the input temperature of the fluid and the output temperature of the steam, such a system requires a continuous source for replenishing the heat transfer fluid and is wasteful of the fluid.

A closed loop system, on the other hand, while having a slightly lower theoretical operating efficiency than the open loop system, has the advantage that no outside source of heat transfer fluid is needed since this system is self-contained. In a closed loop linear concentrating solar collector system, the vaporized fluid from the receiver tube flows into a heat exchanger, where the heat from the vaporizer fluid is extracted and the fluid is condensed. The condensed fluid then flows, or is pumped, to a storage tank for re-use.

One problem with closed loop linear concentrating solar collector systems is that a certain amount of heat transfer fluid must be precisely metered into the receiver tube during each vaporization cycle. If too much fluid is released into the receiver tube, vaporization of a useful quantity of the fluid is slow, thus reducing the operating efficiency of the system. If too little fluid is released into the receiver tube, or if the tube is allowed to run dry, the tube itself can be damaged due to overheating. In addition, such a fluid metering device should be capable of operating continuously and accurately for long periods of time in various weather conditions. Such a device should operate efficiently at various angles, since the orientation of the solar collector changes day by day to track the annual motion of the sun. Further, a linear concentrating solar collector system should be simple to construct, reliable in operation and preferably require no outside source of power for operation.

It is therefore an object of the present invention to provide a closed loop linear concentrating solar collecting system having improved means for regulating the flow of a heat transfer fluid through the system.

It is another object to provide a closed loop concentrating solar collector system which requires no source of power, other than the sun, for operation.

It is a further object to provide a closed loop linear concentrating solar collector system including one or more modular heat exchangers for extracting useful heat from the system.

It is yet another object to provide a closed loop linear concentrating solar collector system which is economical to construct and reliable in operation, and which has a relatively high thermal operating efficiency.

SUMMARY OF THE INVENTION

These and other objects are achieved by the present invention wherein there is provided a closed loop solar collector system comprising a linear concentrating parabolic reflector, a linear vaporizer tube horizontally aligned along the focal line of the parabolic reflector, and a fluid metering assembly attached to one end (input) of the vaporizer tube responsive to the level of heat transfer fluid contained in the vaporizer tube for precisely metering a quantity of a vaporizable heat transfer fluid from a supply tank to the vaporizer tube. Solar energy concentrated by the parabolic reflector on the vaporizer tube vaporizes the heat transfer fluid. The heated vapor flows out the end of the tube opposite the fluid metering assembly (output) through a pipe and enters a heat exchanger. The heat exchanger contains a heat absorptive medium which absorbs heat from the vaporized fluid to cause the vapor to condense and release its latent heat of vaporization to the heat absorptive medium. The condensed fluid flows back to the supply tank for re-use under pressure provided by the vaporized fluid entering the heat exchanger.

The heat exchangers are modular and a plurality of them can be interconnected to provide a desired amount of heat storage capacity. The heat stored by the heat exchangers can be used, for example, to heat air or water for domestic space or hot water heating systems, to power the vaporization cycle of an air conditioning unit, or to power a thermo-electric generator.

The fluid metering assembly includes a float, which senses the fluid level in the linear vaporizer tube, and a pair of valves controlled by the float, the first valve controlling the flow of heat transfer fluid from the supply tank to the vaporizer tube, and the second valve for equalizing the pressure between the vaporizer tube and the supply tank. The normally closed valves are opened when the level of the heat transfer fluid in the vaporizer tube, as sensed by the float, reaches a predetermined minimum level due to vaporization of a substantial quantity of the fluid contained in the vaporizer tube. The float is hingedly connected to the valve so that the fluid metering assembly can be rotated through an angle of at least 45° without substantially affecting the operation of the valve.

The closed loop solar collection system of the present invention provides automatic start-up and cycling, without the need for auxiliary pumps or energy sources. In the event the sun is obscured by clouds, and at night, the bulk of the heat energy accumulated is retained within the heat absorptive medium of the heat exchanger. The fluid metering assembly mounts directly to the vaporizer tube and casts little shadow on the linear parabolic reflector during operation. In addition, the metering assembly is simple in construction while regulating the level of heat transfer fluid in the vaporizer tube for maximum efficiency without being affected by the angular tilt of the linear reflector or vaporizer tube, within a reasonable angular range. Means are also provided for rotating the linear parabolic reflector and the vaporizer tube to follow the annual motion of the sun.

BRIEF DESCRIPTION OF THE DRAWING FIGURES

These and other objects, features, and advantages of the present invention are presented in the following detailed description taken in conjunction with the accompanying drawing figures wherein:

FIGS. 2 and 2A are detailed cross-sectional views (taken at 90° to each other) of the fluid metering and supply tank assemblies;

Figure 6A:
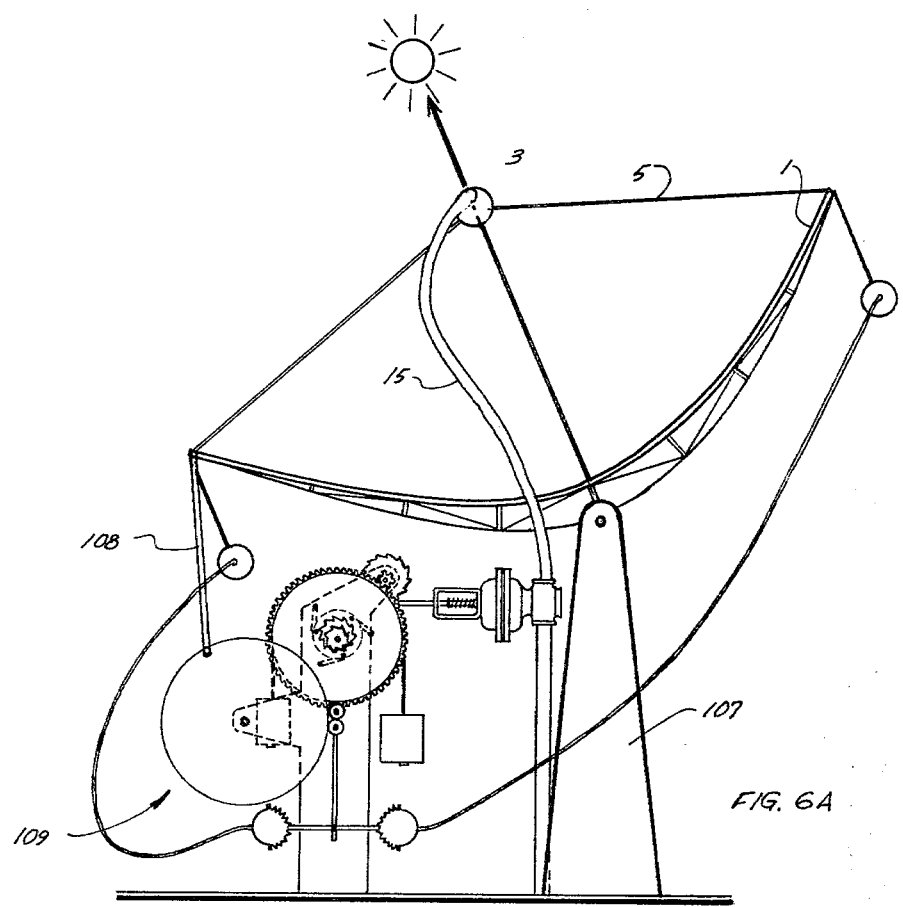
Figure 6B:
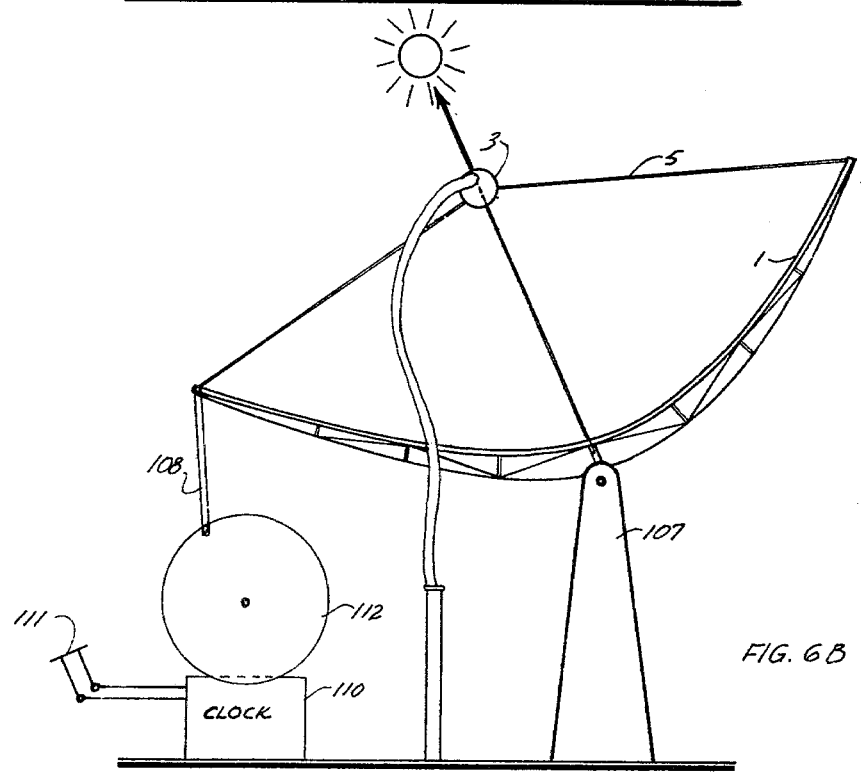

FIG. 4, taken in conjunction with FIG. 5, illustrates the angular displacement of the fluid metering assembly during an annual operating cycle; and FIGS. 6A and 6B illustrate two forms of a sun tracking device for use with the invention.

DETAILED DESCRIPTION OF THE PREFERRED EMBODIMENT

Figure 1:
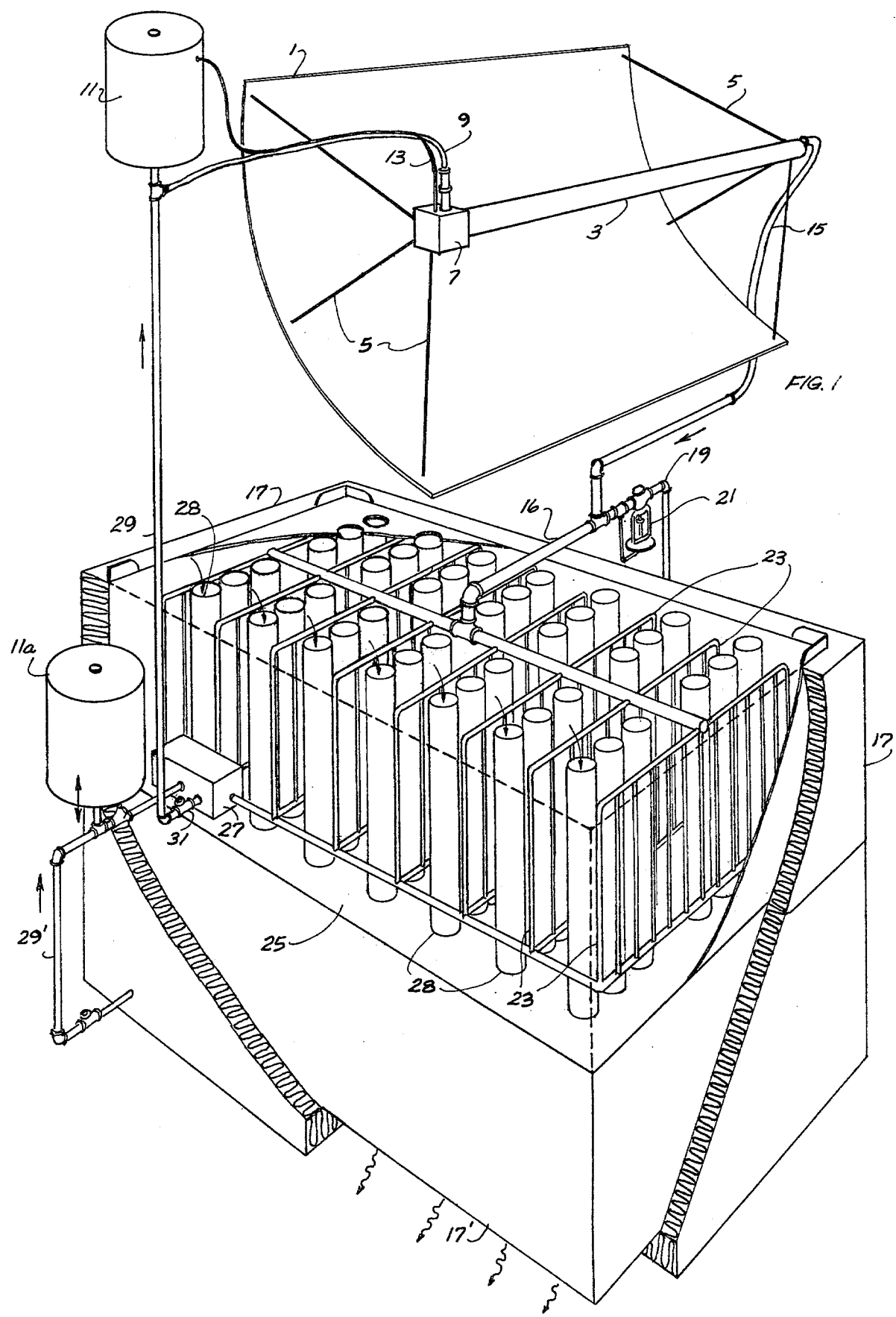
FIG. 1 is a perspective view of the solar collector system of the present invention, with a portion of the casing of one heat exchanger removed to display its internal structure.

The solar collector system of the invention, as shown in FIG. 1, comprises a linear concentrating parabolic reflector 1, a linear fluid receiver or vaporizer tube 3, aligned along focal line of reflector 1 by supports 5, and a fluid metering assembly 7 attached to one end (hereinafter termed the inlet end) of tube 3. Metering assembly 7 is connected through a hose 9 to a fluid supply tank 11. A pressure equalizing hose 13 is also connected between the supply tank and fluid metering assembly.

A measured quantity of a vaporizable heat transfer fluid is contained within vaporizer tube 3. Solar energy concentrated on the vaporizer tube by reflector 1 causes the heat transfer fluid to boil (vaporize) and as a result produces a substantial amount of pressure within tube 3. Linear receiver tube 3 can be constructed having various shapes and cross-sections with a circular cross-section being preferred. Tube 3 can be formed from various materials, such as glass or metal (as outlined in the above-mentioned Sandia Laboratories Report) and is preferably overcoated with an energy absorptive coating, such as black paint, to increase the heat conversion and transfer efficiency of vaporizer tube. The other end of vaporizer tube 3 (hereinafter termed the "outlet end") is connected through an outlet hose 15 to an inlet pipe 16 of a heat exchanger 17 which receives the vaporized fluid under pressure.

As shown in FIG. 1, one or more heat exchangers 17, 17', can be utilized, with additional units being vertically stacked. Each additional heat exchanger is supplied vaporized heat transfer fluid from outlet hose 15 by by-pass pipes 19. Pressure regulators 21 are placed in the by-pass pipes to ensure supplying the vaporized heat transfer fluid at uniform pressure to each heat exchanger.

Once within heat exchanger 17, vaporized heat transfer fluid contained in inlet pipes 16 is supplied to a number of substantially vertical heat exchange channels 23. Channels 23 are disposed within and surrounded by a heat absorptive medium 25 contained within the heat exchanger. Medium 25 absorbs heat from the downwardly flowing vaporized heat transfer fluid. As the vapor releases its latent heat of vaporization to heat absorptive medium 25, the vapor condenses and continues to flow downwardly, under the influence of gravity and under pressure from the vaporized fluid entering the heat exchanger through inlet pipe 16, into an auxiliary storage tank 27. This storage tank or reservoir is disposed below the main body of the heat exchanger.

Storage tank 27 is connected directly to vertical heat exchanger channels 23. A number of fluid transfer channels 28 are also disposed within heat absorptive medium 25 and allow a flow of heat extraction fluid, such as air, therethrough, as shown by the arrows A in FIG. 1. The heat extraction fluid absorbs heat from the absorptive medium of the heat exchanger. The heated extraction fluid can also be water or another fluid and used, for example, to heat a home or office building, heat water, operate the vaporization cycle of an air-conditioning unit, or a power thermo-electric generator. Of course, many other uses of the heat stored by medium 25 will occur to those skilled in the art. The heat exchange medium can be a wide variety of materials. Water, heavy oil, gravel, or mixtures thereof, are but a few of a vast number of inexpensive materials useful as heat absorptive media.

Condensed heat exchange fluid from reservoir 27 is forced upwardly in the existing system under pressure generated in the vaporizer tube 3 through pipe 29' and into supply tank 11. A separate supply tank 11a constructed in the same manner as the tank 11 stores fluid from the heat exchanger 17'. A one-way valve 31 is disposed in pipe 29' to prevent back flow of fluid from tank 11 down pipe 29'. This stored fluid in tank 11a is ready for re-use in the closed loop solar collector system upon demand from the tank 11 and the receiver 3.

Figure 2:
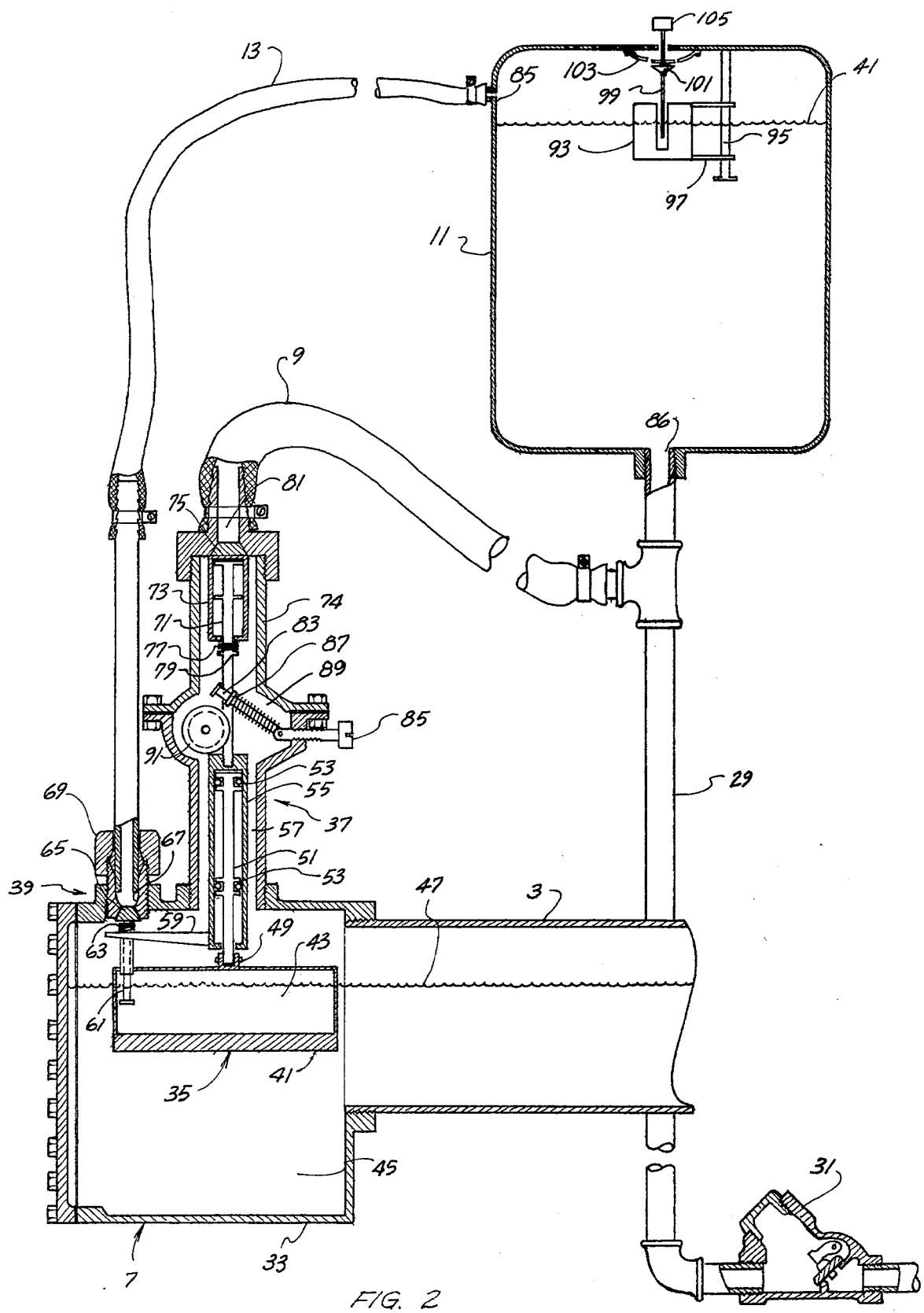

FIG. 2 is a more detailed view of fluid metering assembly 7. The metering assembly comprises a housing 33 attached to the inlet end of vaporizer tube 3, a weighted float 35 hingedly attached to a first poppet valve assembly 37 and also connected to a second valve assembly 39. Float 35 includes a weighted bottom 41 and a hollow or otherwise buoyant chamber 43. Housing 33 further includes a reservoir 45 for containing a portion of a vaporizable heat transfer fluid 47 upon which float 35 rides. Weight 41 is selected so as to fully open the normally closed poppet valve assembly 37 and valve 39 when heat transfer fluid 47 in vaporizer tube 3 in reservoir 45 reaches a predetermined minimum level. The buoyancy of float 35 is selected according to the density of the fluid 47. Heat transfer fluid 47 can be, for example, water, Freon, ammonia, or a heat transfer oil such as Therminol-66, to name but a few examples. Obviously, almost any type of vaporizable heat transfer fluid could be used depending on the specific requirements of the collector system.

Float 35 is connected by hinge 49 to float extender rod 51 which is slidingly supported by bearings 53 within a float extender housing 55. Housing 55 is disposed within lower valve chamber 57 of fluid inlet poppet valve assembly 37. Float extender housing 55 also includes an arm 59 which is attached to plunger 61 of vapor outlet valve 39.

Vapor outlet valve assembly 39 includes a compression spring 63 disposed about plunger 61 between arm 59 and a valve head 65. Valve 39 is normally closed with valve head 65 seated in vapor outlet opening 67. Outlet 67 is connected to pressure equalizing hose 13 through coupling 69. Hose 13 is connected to an upper portion of fluid supply tank 11.

Fluid inlet valve assembly 37 includes an actuator rod 71 attached at one end to the top of float extender housing 55. The other end of rod 71 is slidingly captured within upper cylinder 73. Cylinder 73 is disposed within upper valve chamber 74 of fluid inlet poppet valve assembly 37. Inlet valve head 75 is attached to the upper end of cylinder 73. A compression spring 77, disposed between a stop 79 and a lower portion of cylinder 73 serves to bias valve head 75, carried on cylinder 73, into contact with valve inlet opening 81. Valve assembly 37 is normally closed with valve head 75 seated in fluid inlet opening 81. Inlet 81 is connected through supply hose 9 to fluid supply tank 11.

Midway between upper valve chamber 74 and lower valve chamber 57 is disposed a snap-action or over-center poppet assembly comprising a control lever or plunger 83 hingedly connected at one end to an adjustment screw 85 and slidingly disposed at its other end through a hinge connector 87 connected to actuator rod 71. A compression spring 89 is disposed about plunger 83 between adjustment screw 85 and hinge connection 87. Plunger 83 also engages a portion of a stabilizer pulley 91 which provides a desirable amount of drag to the movement of the rod 71 and the plunger 83. Adjustment screw 85 sets the amount of force to be overcome in moving the poppet valve assembly between open and closed positions (compare FIGS. 3B and 3D). The snap-action poppet assembly acts to open or close the fluid inlet almost instantaneously when the position of plunger 83 is as shown in FIG. 3C. The position of plunger 83 is, in turn, determined by the level of float 35 in fluid reservoir 45. Some free play providing essentially a time delay is accommodated in valve 37 by the sliding engagement of extender rod 51 within extender housing 55 and the sliding engagement of actuator rod 71 within cylinder 73.

Supply tank 11 includes a breather valve assembly for pressure relief when vapor from outlet valve 39 condenses within the top of tank 11. The breather valve assembly includes a float 93 slidingly attached to a rod 95 by brackets 97 and an actuator rod 99 attached to float 93. The upper end of rod 99 carries a stopper 101 which rests against the lower portion of a diaphragm valve 103. The diaphragm valve carries a small weight 105 which acts to open the diaphragm valve when vapor from vapor outlet valve 39 condenses within tank 11. This action breaks the vacuum which would otherwise occur over fluid 47 in tank 11 and allows the ready flow of heat transfer fluid from heat exchanger 17 through pipe 29 into tank 11 when needed.

Figure 3A:
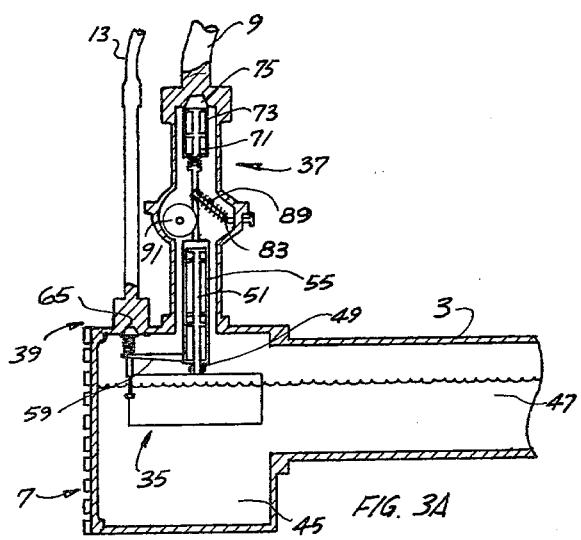
FIGS. 3A through 3F illustrate a complete fluid metering cycle of the fluid metering assembly shown in FIG. 2.
Figure 3B:
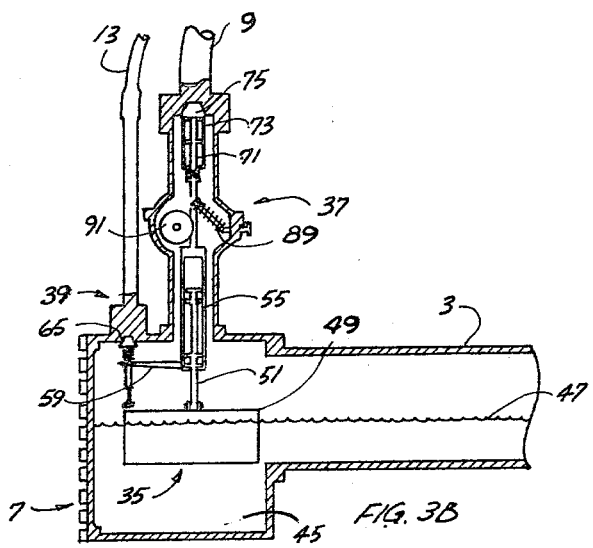
Figure 3C:
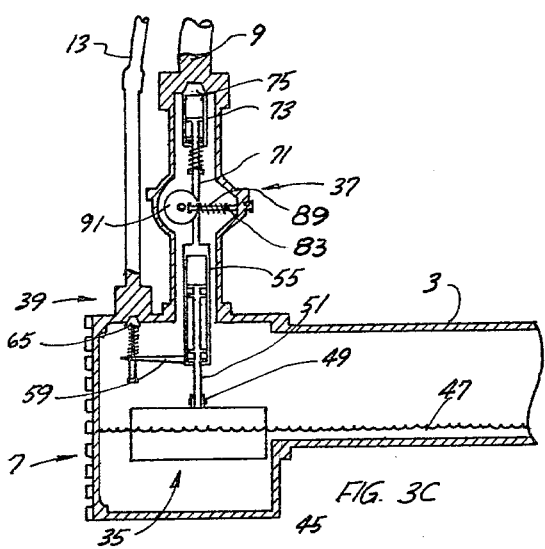
Figure 3D:
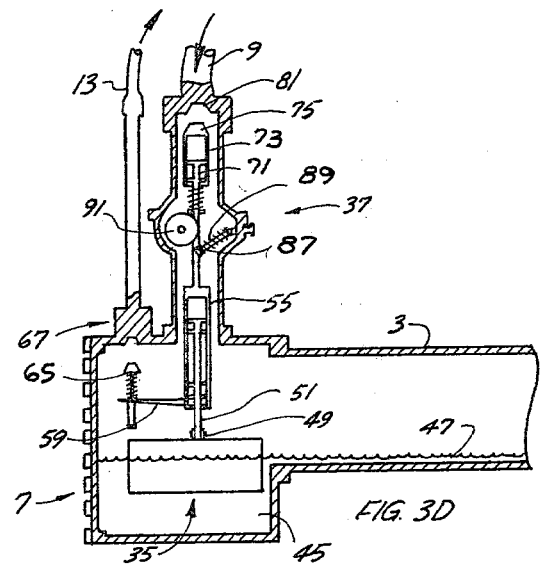

With reference to FIGS. 3A through 3F, a vaporization and refill cycle for vaporizer tube 3 is shown. In FIG. 3A, tube 3 is shown in its filled position with valves 37 and 39 fully closed due to the position of float 35. As fluid 47 contained in vaporizer tube 3 is vaporized by solar energy concentrated thereon by the reflector, the level of fluid 47 contained in tube 3 will fall, as shown in FIGS. 3B and 3C. In FIG. 3C it can be seen that both extender rod 51 and actuator rod 71 have reached their full downward extent of movement and that poppet assembly of valve 37 has reached its switching point. In FIG. 3D the level of fluid in vaporizer tube 3 and reservoir 45 has fallen sufficiently (below a predetermined minimum level) to cause the weight of float 35 to draw poppet valve assembly 37 past its switching point, thus opening both the fluid inlet valve and the vapor outlet valve. Fluid from supply tank 11 rushes inward through opened valve 37 and flows into reservoir 45 and vaporizer tube 3 to replenish the heat transfer fluid in vaporizer tube 3 for the next heating cycle.

Figure 3E:
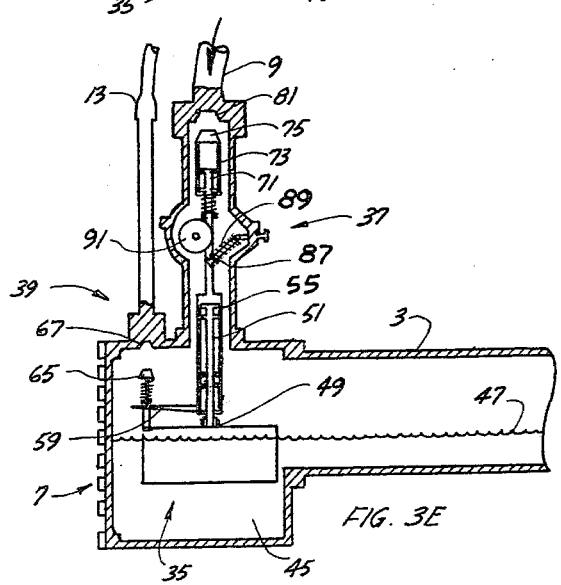
Figure 3F:
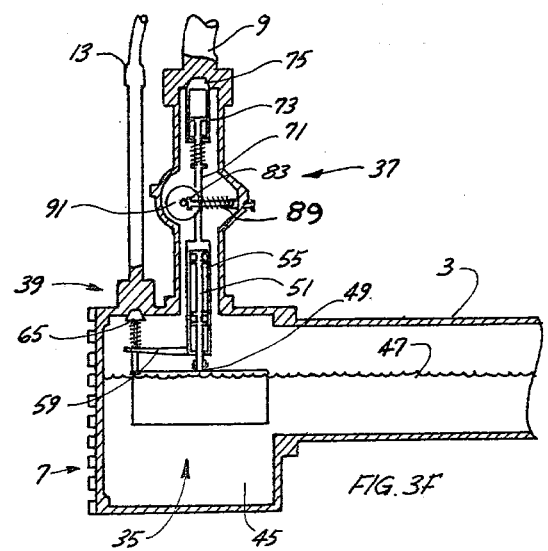

In addition, the vapor pressure generated by vaporizing heat transfer fluid 47 within vaporizer tube 3 is transmitted through opened vapor outlet valve 39 through hose 13 to tank 11 to equalize the pressure therein, as shown in FIG. 3E. In FIG. 3F, the level of heat transfer fluid 47 has risen sufficiently to cause the float 35 to thrust extender rod 51 and actuator rod 71 to the switching point of the poppet assembly of valve 37. The poppet assembly closes both valves 37 and 39 so that a new fluid vaporization cycle may begin.

The snap-action poppet assembly of valve 37 causes the valve to be opened and closed very rapidly thus ensuring precise metering and regulation of the quantity of fluid which flows into reservoir 45 and vaporizer tube 3. Precise adjustment of the amount and level of heat transfer fluid within vaporizer tube 3 ensures that neither too little nor too much fluid will be metered therein. If too little fluid is allowed to flow into vaporizer tube 3 during a particular cycle, much of the solar energy concentrated on tube 3 is wasted, since the excess heat developed could be used to vaporize additional fluid. Indeed, if the vaporizer tube were to run dry, the tube could overheat and be damaged. If too much fluid is allowed to enter vaporizer tube 3 during a particular cycle, it takes an additional amount of time for the majority of the fluid to vaporize, thus slowing down the cycling of the solar collector system and reducing its efficiency. In addition, if too much fluid is present in vaporizer tube 3, pressurization of the system is inhibited since a certain amount of vapor expansion room is necessary for efficient operation.

The quantity of fluid metered into vaporizer tube 3 is precisely controlled in the present invention. The exact quantity metered during each cycle for maximum collector efficiency will depend upon the particular characteristics of the fluid (boiling point, viscosity, etc.) and on the collector temperatures anticipated on the focal line of the parabolic reflector.

As shown in FIG. 4, the metering assembly of the present invention has a particular advantage in that it is operable at varying angles from the vertical. It is expected that the linear parabolic reflector and vaporizer tube assembly of the invention will be mounted with their axes horizontal on a line roughly east to west. The entire collector assembly is tilted, on a daily basis, by a small amount such that the parabola of reflector 1 opens directly towards the sun. In order to accommodate the tilting of metering assembly 7 which thus occurs throughout a solar year, float 35 of metering assembly is hingedly connected to valves 37 and 39. As shown in FIG. 5, for a collector location at 39° N latitude, the solar angle will vary 23.5° above and below the colatitude (51° at the vernal or autumnal equinox) of the sun. When attached to vaporizer tube 3, metering assembly 7 is aligned substantially perpendicular to the earth, as shown in solid lines in FIG. 4, when the reflector vaporizer tube assembly is adjusted to the colatitude of the collector site. As the vaporizer tube is moved in altitude through a solar year, hingedly mounted float 35 accommodates the motion of fluid contained in the reservoir of the metering assembly. Thus the metering assembly can accommodate at least 47° variation of the reflector and vaporizer tube assembly from a given angular position.

In order to adjust the altitude of reflector 1 and vaporizer tube 3 to track the sun, reflector 1 is pivotally attached to a pair of upstanding brackets 107. An arm 108 is connected to an edge of reflector 1 and connected to a clockwork mechanism 109, as shown in FIG. 6A. A stepping motor weight driven escapement mechanism can be used to drive clockwork mechanism 109. The motive source for driving clockwork mechanism 109 is provided by pressure from vapor flowing in hose 15 requiring no outside source of power. This arrangement is preferred where the solar collector system is to be sited in a remote or wilderness area. This type of tracking system is useful for accommodating both daily and seasonal latitude changes. A photocell device (not shown) can be used to sense the daily motion of the sun and cause the clockwork mechanism to increment the altitude of the collector assembly by an appropriate amount on a daily basis. Alternatively, a small battery driven clock 110, charged by a photocell 111, can be used to drive a motor 112 to provide the daily or seasonal tracking adjustment for reflector 1 as shown in FIG. 6B. Of course, many other types of solar tracking systems well known in the art could be used in the practice of the present invention.

Thus, the closed-loop solar collector system of the present invention has many advantages over prior art systems including simplicity and economy of operation. The present invention requires no outside source of power for operation, other than the sun. The metering assembly is simple in construction while regulating the flow of heat transfer fluid into the vaporizer tube for maximum operating efficiency without being affected by the angular tilt of the collector assembly. The collector system provides automatic startup and cycling without the need for auxiliary pumps or energy sources, since the pressure generated by the heat transfer fluid vaporized in the vaporizer tube is used to drive the heat transfer fluid through the return portion of the system after being condensed from its vapor state in the heat exchangers. The heat absorbed by the heat transfer fluid is efficiently transferred to one or more of the modular heat exchangers, from which the stored heat can be extracted to heat air or water for domestic space or water heating systems, to power the vaporization cycle of an air conditioning unit, or to power a thermo-electric generator. Since the present invention is a closed-loop solar collector system, no outside source of heat transfer fluid is necessary.

While the closed-loop linear concentrating solar collecting system of the present invention has been described in considerable detail, it is understood that various changes and modifications may occur to those of ordinary skill in the art without departing from the spirit and scope of the invention as defined in the appended claims.

What is claimed is:

1. A closed loop solar collector system comprising:
    a fluid receiver for collecting solar heat;
    fluid supply means, connected to said fluid receiver, for supplying a quantity of vaporizable heat transfer fluid to said fluid receiver;
    means, attached to said receiver, for precisely metering a quantity of heat transfer fluid in batches into said receiver from said supply means, said metering means including vapor vent means for exposing said fluid supply means to substantially atmospheric pressure during supplying of said fluid to said receiver; and
    heat exchanger means, connected to said fluid receiver, for absorbing heat energy from said heat transfer fluid which is vaporized in said receiver, said vaporized heat transfer fluid condensing after releasing its latent heat of vaporization to said heat exchanger, said condensed fluid flowing, under pressure provided by said vaporized fluid entering said heat exchanger means, to said supply means.

2. The solar collector system of claim 1 wherein said fluid receiver comprises a linear concentrating parabolic reflector;
a linear fluid receiver disposed along the focal line of said linear parabolic reflector; and said linear fluid receiver is substantially horizontally aligned and wherein said metering means is responsive to the level of heat transfer fluid contained in said linear fluid receiver.

3. The solar collector system of claim 2 wherein said linear fluid receiver comprises a horizontally aligned vaporizer tube of substantially circular cross-section.

4. The solar collector system of claim 2 further including means for rotating said parabolic reflector and said linear receiver to follow the annual motion of the sun.

5. The solar collector system of claim 1 wherein said heat exchanger means comprises:
a heat transfer tank, containing a heat absorptive storage medium;
a plurality of heat exchange channels vertically disposed within said heat transfer tank and connected to said second end of said fluid receiver for receiving vaporized heat transfer fluid under pressure from said receiver, said heat transfer fluid condensing after releasing its latent heat of vaporization to said heat absorptive medium, said condensed heat transfer fluid flowing downwardly into an auxiliary fluid storage tank, said auxiliary fluid storage tank being connected to said fluid supply means, said condensed fluid in said auxiliary fluid storage tank flowing under pressure, provided by said vaporized heat transfer fluid entering said heat exchange channels, into said supply means; and
a plurality of fluid flow channels for extracting heat from said heat transfer tank.

6. The solar collector system of claim 5 wherein a plurality of said heat exchangers are interconnected.

7. A closed loop solar collector system, comprising:
a concentrating parabolic reflector;
vaporizer means containing a quantity of heat transfer fluid to be vaporized by solar energy focused on said vaporizer means by said reflector;
a fluid supply tank, connected to said vaporizer means, for storing a quantity of said vaporizable heat transfer fluid and supplying said fluid to said vaporizer means;
a float actuated valve assembly, attached to said vaporizer means and responsive to the level of said heat transfer fluid in said vaporizer means, for precisely metering a quantity of heat transfer fluid in batches from said supply tank into said vaporizer means and venting said tank to substantially atmospheric pressure when said fluid reaches a predetermined minimum level in said vaporizer means due to vaporization of a substantial quantity of said fluid contained in said vaporizer means; and
at least one modular heat exchanger connected to said vaporizer means, for absorbing heat energy from said heat transfer fluid which is vaporized in said vaporizer means, said vaporized heat transfer fluid condensing after releasing its latent heat of vaporization to said heat exchanger, said condensed fluid flowing, under pressure provided by said vaporized fluid entering said heat exchanger, to said supply tank.

8. The solar collector system of claim 7 further including means for rotating said reflector and said vaporizer means to follow the annual motion of the sun.

9. The solar collector system of claim 7 wherein each said modular heat exchanger comprises:
a heat transfer tank, containing a heat absorptive storage medium;
a plurality of heat exchange channels vertically disposed within said heat transfer tank and connected to said vaporizer means for receiving vaporized heat transfer fluid under pressure from said vaporizer means, said heat transfer fluid condensing after releasing its latent heat of vaporization to said heat absorptive storage medium, said condensed heat transfer fluid flowing downwardly into an auxiliary fluid storage tank, said auxiliary fluid storage tank being connected to said fluid supply tank, said condensed fluid in said auxiliary storage tank flowing under pressure, provided by said vaporized heat transfer fluid entering said heat exchange channels, into said supply tank; and
a plurality of fluid flow channels for extracting heat from said heat transfer tank.

10. A closed loop solar collector system comprising:
a fluid receiver for collecting solar heat;
fluid supply means, connected to said fluid receiver, for supplying a quantity of vaporizable heat transfer fluid to said fluid receiver;
means, attached to said receiver, for precisely metering a quantity of heat transfer fluid in batches into said receiver from said supply means;
heat exchanger means, connected to said fluid receiver, for absorbing heat energy from said heat transfer fluid which is vaporized in said receiver, said vaporized heat transfer fluid condensing after releasing its latent heat of vaporization to said heat exchanger, said condensed fluid flowing, under pressure provided by said vaporized fluid entering said heat exchanger means, to said supply means, said fluid receiver comprising a linear concentrating parabolic reflector; and
a linear fluid receiver disposed along the focal line of said linear parabolic reflector; and said linear fluid receiver being substantially horizontally aligned and wherein said metering means is responsive to the level of heat transfer fluid contained in said linear fluid receiver, said metering means comprises a housing, a float disposed within said housing and responsive to the level of heat transfer fluid contained in said linear fluid receiver, first and second valves responsive to said float level, said first valve for controlling the flow of heat transfer fluid from said supply means into said linear fluid receiver, and said second valve for equalizing the pressure between said receiver and said supply means, whereby said first and second valves are open for respective fluid and vapor flow when said level of heat transfer fluid in said linear fluid receiver reaches a predetermined minimum level due to vaporization of a substantial quantity of said fluid contained in said linear fluid receiver.

11. The solar collector system of claim 10 wherein said first and second valves are poppet valves which are normally closed in response to said float level when said fluid level in said receiver is above a predetermined minimum, and wherein said float is hingedly connected to said valves whereby said metering means can be rotated through an angle of at least 45° to the vertical without substantially affecting the operation of said float operated valves.

12. A closed loop solar collector system comprising:
a fluid receiver for collecting solar heat;
fluid supply means, connected to said fluid receiver, for supplying a quantity of vaporizable heat transfer fluid to said fluid receiver;
means, attached to said receiver, for precisely metering a quantity of heat transfer fluid in batches into said receiver from said supply means;
heat exchanger means, connected to said fluid receiver, for absorbing heat energy from said heat transfer fluid which is vaporized in said receiver, said vaporized heat transfer fluid condensing after releasing its latent heat of vaporization to said heat exchanger, said condensed fluid flowing, under pressure provided by said vaporized fluid entering said heat exchanger means, to said supply means;
a heat transfer tank, containing a heat absorptive storage medium;
a plurality of heat exchange channels vertically disposed within said heat transfer tank and connected to said second end of said fluid receiver for receiving vaporized heat transfer fluid under pressure from said receiver, said heat transfer fluid condensing after releasing its latent heat of vaporization to said heat absorptive medium, said condensed heat transfer fluid flowing downwardly into an auxiliary fluid storage tank, said auxiliary fluid storage tank being connected to said fluid supply means, said condensed fluid in said auxiliary fluid storage tank flowing under pressure, provided by said vaporized heat transfer fluid entering said heat exchange channels, into said supply means;
a plurality of fluid flow channels for extracting heat from said heat transfer tank;
a plurality of said heat exchangers being interconnected; and
said heat exchangers being stacked one on top of the other, said parabolic reflector and said linear fluid receiver being mounted atop the topmost heat exchanger, and wherein the auxiliary fluid storage tank of one heat exchanger is connected to the supply means of the next higher heat exchanger, said interconnection including a one-way valve to prevent backflow of heat transfer fluid, the auxiliary fluid storage tank of the topmost heat exchanger being connected to said fluid supply means of said fluid receiver.

13. A closed loop solar collector system, comprising:
a concentrating parabolic reflector;
vaporizer means containing a quantity of heat transfer fluid to be vaporized by solar energy focused on said vaporizer means by said reflector;
a fluid supply tank, connected to said vaporizer means, for storing a quantity of said vaporizable heat transfer fluid and supplying said fluid to said vaporizer means;
a float actuated valve assembly, attached to said vaporizer means and responsive to the level of said heat transfer fluid in said vaporizer means, for precisely metering a quantity of heat transfer fluid from said supply tank into said vaporizer means when said fluid reaches a predetermined minimum level in said vaporizer means due to vaporization of a substantial quantity of said fluid contained in said vaporizer means;
at least one modular heat exchanger connected to said vaporizer means, for absorbing heat energy from said heat transfer fluid which is vaporized in said vaporizer means, said vaporized heat transfer fluid condensing after releasing its latent heat of vaporization to said heat exchanger, said condensed fluid flowing, under pressure provided by said vaporized fluid entering said heat exchanger, to said supply tank; and
said valve assembly comprising a housing, a float disposed within said housing and responsive to the level of heat transfer fluid contained in said vaporizer means, first and second valves responsive to said float level, said first valve for controlling the flow of heat transfer fluid from said supply tank into said vaporizer means, and said second valve for equalizing pressure between said vaporizer means and said supply tank, whereby said first and second valves are opened for respective fluid and vapor flow when said level of heat transfer fluid in said vaporizer means reaches a predetermined minimum level due to vaporization of a substantial quantity of said fluid contained in said vaporizer means.

14. The solar collector system of claim 13 wherein said first and second valves are poppet valves which are normally closed in response to said float level when said fluid level in said vaporizer means is above the predetermined minimum, and wherein said float is hingedly connected to said valves whereby said valve assembly can be rotated through an angle of at least 45° to the vertical without substantially affecting the operation of said float operated valves.

15. A closed loop solar collector system, comprising:
a concentrating parabolic reflector;
vaporizer means containing a quantity of heat transfer fluid to be vaporized by solar energy focused on said vaporizer means by said reflector;
a fluid supply tank, connected to said vaporizer means, for storing a quantity of said vaporizable heat transfer fluid and supplying said fluid to said vaporizer means;
a float actuated valve assembly, attached to said vaporizer means and responsive to the level of said heat transfer fluid in said vaporizer means, for precisely metering a quantity of heat transfer fluid from said supply tank into said vaporizer means when said fluid reaches a predetermined minimum level in said vaporizer means due to vaporization of a substantial quantity of said fluid contained in said vaporizer means;
at least one modular heat exchanger connected to said vaporizer means, for absorbing heat energy from said heat transfer fluid which is vaporized in said vaporizer means, said vaporized heat transfer fluid condensing after releasing its latent heat of vaporization to said heat exchanger, said condensed fluid flowing, under pressure provided by said vaporized fluid entering said heat exchanger, to said supply tank;
said modular heat exchanger comprising a heat transfer tank, containing a heat absorptive storage medium;
a plurality of heat exchange channels vertically disposed within said heat transfer tank and connected to said vaporizer means for receiving vaporized heat transfer fluid under pressure from said vaporizer means, said heat transfer fluid condensing after releasing its latent heat of vaporization to said heat absorptive storage medium, said condensed heat transfer fluid flowing downwardly into an auxiliary fluid storage tank, said auxiliary fluid storage tank being connected to said fluid supply tank, said condensed fluid in said auxiliary storage tank flowing under pressure, provided by said vaporized heat transfer fluid entering said heat exchange channels, into said supply tank;

a plurality of fluid flow channels for extracting heat from said heat transfer tank; and a plurality of said heat exchangers stacked one on top of the other, said reflector and said vaporizer means being mounted on top of the topmost heat exchanger, and wherein the auxiliary fluid storage tank of one heat exchanger is connected to the supply tank of the next higher heat exchanger, said interconnection including a one-way valve to prevent backflow of said heat transfer fluid, the auxiliary fluid storage tank of the topmost heat exchanger being connected to said supply tank of said reflector and receiver.

* * * * *